Patented May 31, 1938

2,118,864

UNITED STATES PATENT OFFICE 2,118,864

POLYMERIZATION PRODUCTS FROM VINYL ESTERS

Walter Reppe, Ludwigshafen-on-the-Rhine, Werner Starck, Hofheim (Taunus), and Arthur Voss, Frankfort-on-the-Main-Hochst, Germany, assignors to I. G. Farbenindustrie Aktiengesellschaft, Frankfort-on-the-Main, Germany No Drawing. Application June 3, 1937, Serial No. 146,198. In Germany March 5, 1932

15 Claims. (Cl. 260—2)

The present invention relates to valuable polymerization products of vinyl esters of carboxylic acids.

We have found that valuable products can be obtained by subjecting to polymerization vinyl esters of carboxylic acids containing at least 8 carbon atoms in the molecule, i. e., of aliphatic, saturated and unsaturated, mono- and polycarboxylic acids containing at least 8 carbon atoms in the molecule, of cyclic, that is aromatic, cycloaliphatic and heterocyclic, mono- and polycarboxylic acids and of mixed aliphatic-aromatic and mixed aliphatic-cycloaliphatic, mono- and polycarboxylic acids, the carboxylic groups of which mixed acids may be attached to the aliphatic as well as to the cyclic radicle.

The above mentioned vinyl esters of carboxylic acids containing at least 8 carbon atoms in the molecule are prepared by treatment of these carboxylic acids in liquid phase with acetylene in the presence of zinc or cadmium salts of carboxylic acids.

Suitable vinyl esters are for example caprylic acid, lauric acid, palmitic acid, margaric acid, stearic acid, oleic acid, adipic acid, myristic and sebacic acid, of cyclic acids such as for instance aromatic carboxylic acids such as ortho-, meta- and paratoluic acids or abietic acid, and the different isomers of naphthoic acid, of mixed aliphatic-aromatic acids, as for example phenyl acetic acid, cinnamic acid, phenylglycine, and of polybasic cyclic acids or their acid esters, such as phthalic acid and phthalic acid monoalkyl esters, for example monoethyl, normal or isobutyl esters, cyclic hydroxy-carboxylic acids, as for example salicylic acid or hydroxynaphthoic acid, and heterocyclic acids, such as pyridine and quinoline carboxylic acids, and hydroaromatic carboxylic acids, as for example hydrophthalic acid. Instead of vinyl esters of pure acids, vinyl esters of partially esterified acids, and/or of natural resins having a high acid value, such as colophony, or vinyl esters of mixtures of acids may be employed, as for example the mixtures of acids obtainable by the saponification of natural fats and fatty oils containing esters and/or fatty acids, or the mixtures of acids obtainable by oxidizing paraffin wax or montan wax.

The polymerization of the said vinyl esters may be effected by irradiation and/or heating.

Known polymerization catalysts, such as oxygen in any form, as for example free oxygen, organic peroxides, as for example acetyl or benzoyl peroxides, or peracetic or perbenzoic acids, inorganic peroxides, as for example hydrogen peroxide or barium peroxide or other inorganic agents supplying oxygen, such as perborates or percarbonates, especially of alkali and alkaline earth metals, such as sodium, potassium, lithium, barium, calcium or strontium, silver oxide or ozone, may be added to the esters in order to accelerate the polymerization. The said catalysts are generally added in an amount of from about 0.1 to about 5, preferably from about 0.5 to about 2 per cent by weight of the said esters, if desired together with organic acids or acid anhydrides thereof, such as acetic acid anhydride, which latter are usually employed in a quantity of about 10 times the weight of the catalyst used. The polymerization by heating is generally carried out by boiling the said esters, preferably in an open or closed vessel provided with a reflux condenser or in a closed vessel without reflux. The time necessary for heating depends on the desired degree of polymerization and also upon the quantity of ester subjected to the reaction, the desired degree being easily ascertained by drawing off a sample of the polymerized product from the vessel, the polymerization requiring usually at least half an hour. The reaction can also be carried out continuously, by continuously introducing monomeric compounds into the polymerization vessel at the rate at which the polymerization proceeds, the polymerized product being drawn off, preferably at the other end of the vessel. In this manner injurious overheating may be prevented. The said overheating may also be avoided by adding any polymerization catalyst employed in small portions only and providing sufficient time between the addition of each portion to allow the reaction mixture to cool down again to the desired temperature.

The polymerization may be carried out, if desired, in the presence of diluents, such as water, neutral aqueous solutions, such as neutral aqueous solutions of emulsifying agents, as for example of Turkey red oil or of alkylated naphthalene sulphonic acid sodium salts, weakly acid solutions, as for example dilute aqueous acetic acid, weakly alkaline solutions, as for example aqueous soap solutions, or inert gases, as for example carbon dioxide or nitrogen, if desired with the application of pressure in one or more stages, in the presence or absence of known polymerization regulators, as for example aldehydes such as salicyl aldehyde, which may also act as solvents if a larger amount thereof be employed and/or of organic solvents, as for example ethyl alcohol, benzene, methyl, ethyl or amyl acetate, chlorbenzene, carbon tetrachloride, chloroform, dichlorethylene, ketones, such as acetone and cyclohexanone, or nitrated hydrocarbons, such as nitrobenzene. The polymerization may also be carried out with the aid of adsorptive substances, as for example the usual bleaching earths or active carbon, or of organic acid chlorides, as for example toluene sulphochloride, these substances being employed in the same amount as the above mentioned catalysts. The said vinyl esters may also be polymerized in aqueous suspensions in the presence of emulsifiers and of the aforesaid polymerization catalysts. By subsequently hardening the resulting polymerization products at from 100° to about 120° C., products can be obtained which may advantageously be employed for the preparation of lacquers. The polymerization may also be carried out only so far that the polymerization product still contains incompletely and/or non-polymerized constituents.

The vinyl esters may be interpolymerized with each other, or with the vinyl esters of lower fatty acids or with other organic substances capable of being polymerized. Vinyl esters of lower fatty acids are for example those of acetic acid, chloracetic acid, propionic acid and butyric acid. Other substances capable of being polymerized comprise vinyl halides, such as vinyl bromide and especially vinyl chloride, styrene, acrylic esters, in particular methyl and ethyl esters of acrylic acid, esters of homologues of acrylic acid, such as alpha-methyl acrylic acid, acrylic nitrile, vinyl ketones, such as vinyl ethyl or vinyl normal-butyl ketones and diolefines, as for example butadiene.

The interpolymerization, according to the present invention, of vinyl esters with each other, with vinyl esters of lower fatty acids and/or with the aforesaid substances capable of being polymerized, may be effected in exactly the same manner as the polymerization of the single vinyl esters. The quantity of a polymerization catalyst employed is the same with reference to the whole amount of the mixture of polymerizable substances as in the case of the polymerization of single esters.

The properties of the polymerized products depend upon the nature of the initial materials and the conditions of polymerization. Thus for example the products obtainable by polymerizing vinyl esters of open chain aliphatic carboxylic acids containing from 8 to 12 carbon atoms or of cycloaliphatic carboxylic acids containing about the same number of carbon atoms are colorless, elastic masses resembling soft vulcanized rubber, whereas the corresponding esters of aliphatic, saturated open chain or cycloaliphatic acids containing more than 12 carbon atoms are colorless, solid, wax-like substances capable of being pulverized and resembling paraffin wax, which may be moulded while hot, these polymerization products being reversibly thermoplastic if heating has been carried out for a very long time. On the other hand, the polymerization products, obtainable from vinyl esters of aliphatic saturated open chain and cycloaliphatic carboxylic acids containing from 8 to 12 carbon atoms as well as those obtainable from such acids containing more than 12 carbon atoms are generally fusible to nearly colorless liquids if the polymerization has not been carried out very far, whereas they only become soft without melting if the products are highly polymerized. The products resulting from a far reaching polymerization of vinyl esters of the said acids containing from 8 to 12 carbon atoms, generally become sticky, soft masses on heating.

The polymerization products of unsaturated aliphatic carboxylic acids containing more than 12 carbon atoms, as for example oleic acid, are highly viscous liquids similar to boiled linseed oil. The polymerization products prepared from the said vinyl esters of unsaturated acids, as for example oleic acid, or ricinoleic acid, have drying properties, that is they harden under the influence of air and particularly rapidly in the presence of so-called siccatives or driers, as for example base metal salts, especially cobalt, lead and/or manganese salts of vegetable drying oil acids, resinic acids or naphthenic acids.

The polymerization products of vinyl esters of aromatic carboxylic acids generally are from colorless to yellow or brownish yellow resins which are more or less hard, according to the degree of polymerization. Most of these polymerization products are capable of being pressure-moulded while hot, the hardness of such products being increased by a subsequent heat treatment at temperatures ranging from 100° to about 150° C.

The products obtainable by an incomplete polymerization are soluble in aromatic hydrocarbons such as benzene, toluene and xylene and in liquid chlorination products of such hydrocarbons, in ketones, such as acetone and cyclohexanone, in chlorinated aliphatic hydrocarbons of low molecular weight, such as chloroform, ethylene chloride and carbon tetrachloride, in liquid aliphatic monohydric alcohols containing more than 2 carbon atoms, such as propyl, butyl or amyl alcohols, and in esters of aliphatic carboxylic acids of low molecular weight, for example in ethyl, n-butyl or amyl acetate. Methyl and ethyl alcohols do not dissolve the said polymerization products but may be employed as diluents with the aforesaid solvents insofar as they are miscible therewith. The products obtainable by a far reaching polymerization generally only swell in the aforesaid solvents.

The polymerization products may be employed as varnishes and lacquers, if desired together with cellulose derivatives compatible therewith, such as nitrocellulose and benzyl cellulose. The employment of mixtures of the said polymerization products with the said cellulose derivatives is very advantageous in the art of varnishes and lacquers because the films and coatings obtainable therefrom on surfaces of any kind, such as wood, metal, glass, paper, cardboard, leather or textile materials are very fast to light and stable to water. The polymerization products and the mixtures thereof with the aforesaid cellulose derivatives may be employed together with inert fillers such as slate meal, carbon black or ground asbestos, with organic or inorganic pigments, such as white lead, colcothar, Indanthrene blue, Lithol red lakes, with organic dyestuffs soluble in the organic solvents employed for the preparation of the lacquers or varnishes, and/or with softening agents such as phthalic esters, or neutral aryl phosphates. The wax-like products, obtainable by polymerizing vinyl esters of aliphatic open chain or cycloaliphatic carboxylic acids containing more than 12 carbon atoms may be advantageously added to polishing preparations, the coatings obtainable therefrom being distinguished by a very high gloss.

The polymerization of the mixtures may be carried out after mixing the esters of the carboxylic acids containing at least 8 carbon atoms with each other or with one or several of the aforesaid polymerizable substances. It is also possible to incorporate the monomeric compounds with the aforesaid additions such as solvents, fillers, pigments and also softening agents or also with the said cellulose derivatives. Moreover, it is possible to incompletely polymerize either of the polymerizable substances and to mix the incompletely polymerized compound with the other, still monomeric substance, the interpolymerization of the mixture being then carried out to the desired degree.

The polymerization of mixtures containing vinyl esters of carboxylic acids containing 8 or more carbon atoms with other polymerizable substances, especially with vinyl esters of lower fatty acids, yields products which show a degree of polymerization much higher than that obtainable by polymerizing the single components alone. Thus, for example, a mixture of, say, vinyl acetate, chloracetate or chloride, with only a few per cent by weight or even less than 1 per cent, by weight, of the said vinyl esters of carboxylic acids containing 8 or more carbon atoms, may be polymerized to products showing a much higher degree of polymerization than polymerization products from the said vinyl acetate, chloracetate or chloride alone. This phenomenon is most surprising, and quite new in the art of interpolymerization.

The products resulting from the said interpolymerization have very valuable properties. Particularly valuable products can be obtained by interpolymerization of the vinyl esters obtainable from mixtures of the acids resulting in strong bleaching of Montan wax, for example by the action of chromic acid, of the vinyl esters of the acids obtainable by the oxidation of hard or soft paraffin wax, in particular by blowing the wax in the liquid phase with air at about 160° C. or of the mixtures of acids obtainable by the saponification of fatty oils such as coconut oil or palm kernel oil.

The interpolymerization of mixtures of vinyl esters of aliphatic carboxylic acids containing at least 8 carbon atoms with the other, aforesaid polymerizable substances is usually carried out with mixtures of polymerizable substances containing from about 0.5 to about 20, preferably from about 5 to about 10 per cent, by weight, of the mixture of both types of polymerizable substances, of the said vinyl esters of carboxylic acids containing at least 8 carbon atoms. Thus for example the stability to water and the elasticity of polymerization products from mixtures of vinyl acetate, vinyl chloracetate or vinyl chloride, or of methyl or ethyl esters of acrylic acid with the addition of vinyl esters of carboxylic acids containing at least 8 carbon atoms in a quantity of from about 0.5 to about 20, preferably from 5 to about 10 per cent, by weight of the mixture are considerably increased by the said addition, whereas the brittleness of the products at low temperatures is considerably lowered. Particularly valuable interpolymerized products may thus be obtained for example by the interpolymerization of 20 parts of the vinyl ester of lauric acid with 80 parts of the methyl or ethyl ester of acrylic acid.

Similarly, the softening point of polymerized products obtainable from mixtures of vinyl chloride, styrene or acrylic nitrile with the aforesaid amounts of vinyl esters of carboxylic acids containing at least 8 carbon atoms, especially of vinyl esters of stearic, palmitic and/or oleic acids, is considerably lowered in comparison to that of polymerization products from vinyl chloride and the like alone, whereas the elasticity and thermoplasticity of the products is considerably improved.

If vinyl chloride, styrene or acrylic nitrile be employed in a comparatively small amount for the interpolymerization, for example if vinyl esters of carboxylic acids containing at least 8 carbon atoms be interpolymerized with, say, from about 0.5 to about 20 per cent by weight of one of the said polymerizable substances, the hardness and the softening point of the resulting interpolymerized products is increased with respect to that of the polymerization products resulting from vinyl esters of the said carboxylic acids alone.

The following examples will further illustrate how the invention may be carried out in practice but the invention is not restricted to these examples. The parts are by weight.

*Example 1*

A mixture of 90 parts of vinyl acetate with 10 parts of vinyl oleate and 2 parts of benzoyl peroxide is heated for 8 hours to about 90° C. in a vessel provided with a reflux condenser. A colorless, very tough product is thus obtained which is insoluble in aromatic hydrocarbons and other organic solvents, such as acetone or ethylenechloride but only swells therein. The interpolymerized product may be worked into articles of any shape by pressure-moulding.

*Example 2*

A mixture of 100 parts of vinyl acetate with 5 parts of vinyl palmitate and 2 parts of benzoyl peroxide is refluxed on a water bath. The reaction is very turbulent. After about 6 hours, a colorless, resinous product is obtained which is very hard and elastic at room temperature. The interpolymerized product swells slightly in aromatic hydrocarbons such as benzene, toluene or xylene and may be pressure-moulded to artificial masses of any shape.

*Example 3*

A mixture of 190 parts of vinyl chloracetate with 10 parts of vinyl stearate is heated to about 80° C. in a vessel provided with a reflux condenser together with 40 parts of acetone and 3 parts of benzoyl peroxide. The reaction mixture soon becomes viscous which shows that the polymerization has set in. After about 10 hours a very viscous solution of a colorless resin is obtained which may be diluted by the addition of a further amount of acetone or of another organic solvent such as aromatic hydrocarbons, as for example benzene, toluene or xylene, or chlorinated aliphatic hydrocarbons such as chloroform or ethylene chloride. The solution constitutes an excellent basis for varnishes and lacquers. Films obtained by evaporating the solution on substrata, such as wood, glass or metal surfaces are colorless, very stable to water and show a very high gloss and resistance to mechanical influences.

Example 4

A mixture of 270 parts of vinyl chloride, 30 parts of oleic acid vinyl ester, 150 parts of benzine and 1.5 parts of benzoyl peroxide is heated, while stirring, in an aluminum lined autoclave, for 6 hours to 60° C. and then for 8 hours to 80° C. A white powder is thus obtained which is separated from the benzine by filtration and drying in vacuo. The product may be pressure-moulded to hard elastic articles which are stable at elevated temperatures and highly resistant to water.

Example 5

20 parts of lauric acid vinyl ester and 80 parts of acrylic acid methyl ester are emulsified in 300 parts of water containing 3 parts of the sodium salt of hydroxyoctodecane sulphonic acid as an emulsifying agent, 0.15 part of peracetic acid and 0.85 part of glacial acetic acid. The resulting emulsion is heated to about 95° C., while stirring in a vessel provided with a reflux condenser. The product is obtained in the form of a latex-like liquid which is coagulated by freezing out or by the addition of dilute aqueous solutions of acids such as acetic, sulphuric, or hydrochloric acids, or of salts such as sodium chloride. The coagulated product is washed with water and then dried.

Coatings and films obtained from the product by spraying solutions thereof in organic solvents, such as aromatic hydrocarbons, ketones, esters of acetic acid or chlorinated aliphatic hydrocarbons, on substrata of any kind, such as glass, wood or metal surfaces, are very stable to water and show a very high gloss and a much lower brittleness at low temperatures than coatings and films prepared from the polymerization product of the said acrylic ester alone.

Instead of the said lauric ester, the corresponding vinyl esters of caprylic, myristic or palmitic acids may be employed, the polymerized products being especially suitable for the production of compound glass stable at low temperatures. The stability to water and the elasticity at low temperatures of the interpolymerized products increase with the number of carbon atoms of the vinyl esters and the proportion of the said esters in the interpolymerized product.

Example 6

1 part of benzoyl peroxide is slowly stirred, in the course of 2 hours, into 100 parts of caprylic acid vinyl ester, while the reaction mixture is heated at from 95° to 98° C. A practically colorless polymerization product is obtained which, at room temperature, is an elastic mass, soluble in organic solvents such as acetone or benzene. If the said caprylic acid ester is polymerized in the presence of a larger amount of catalyst, for example in the presence of from 5 to 10 parts of benzoyl peroxide or peracetic acid, a yellowish tough product is obtained which only swells in organic solvents such as acetone or benzene.

Instead of 1 part of benzoyl peroxide, the same amount of peracetic acid may be employed for the polymerization. It is also possible to carry out the polymerization in the presence of inert organic solvents, for example by dissolving the above stated amount of monomeric ester in its own weight of benzene, the reaction being then carried out at the boiling point of the solution, while slowly introducing the benzoyl peroxide or peracetic acid employed as catalyst.

Soluble and elastic polymerization products may likewise be obtained by polymerizing in the manner described in the first paragraph, the vinyl ester of ethyl(2)-hexane-carboxylic(1)acid, whereas the polymerization products of vinyl esters of long chain fatty acids, such as palmitic or stearic vinyl esters are from colorless to yellow wax-like substances at room temperature.

The present invention is a continuation-in-part of our parent application Ser. No. 658,146 filed Febr. 23, 1933.

What we claim is:—

1. A process for the production of valuable products from vinyl esters, which comprises subjecting to polymerization at least one vinyl ester of an aliphatic carboxylic acid containing at least 8 carbon atoms.

2. A process for the production of valuable products from vinyl esters, which comprises subjecting to polymerization at least one vinyl ester of an aliphatic carboxylic acid containing at least 8 carbon atoms in the presence of a substance capable of supplying oxygen as a polymerization catalyst.

3. A process for the production of valuable products from vinyl esters, which comprises subjecting to polymerization at least one vinyl ester of an aliphatic carboxylic acid containing at least 8 carbon atoms by heating in the presence of a substance capable of supplying oxygen as a polymerization catalyst.

4. A process for the production of valuable products from vinyl esters, which comprises subjecting to polymerization at least one vinyl ester of an aliphatic carboxylic acid containing at least 8 carbon atoms in the presence of a substance capable of supplying oxygen as a polymerization catalyst and of an inert diluent.

5. A process for the production of valuable products from vinyl esters, which comprises subjecting to polymerization at least one vinyl ester of an aliphatic carboxylic acid containing at least 8 carbon atoms by heating in the presence of a substance capable of supplying oxygen as a polymerization catalyst, and of an inert diluent.

6. A process for the production of valuable products from vinyl esters, which comprises subjecting to polymerization at least one vinyl ester of an aliphatic carboxylic acid containing at least 8 carbon atoms and another organic substance polymerizable under the same conditions as the said vinyl ester.

7. A process for the production of valuable products from vinyl esters, which comprises subjecting to polymerization at least one vinyl ester of an aliphatic carboxylic acid containing at least 8 carbon atoms and another polymerizable vinyl compound.

8. A process for the production of valuable products from vinyl esters, which comprises subjecting to polymerization at least one vinyl ester of an aliphatic carboxylic acid containing at least 8 carbon atoms and a vinyl ester of a carboxylic acid containing less than 5 carbon atoms.

9. A process for the production of valuable products from vinyl esters, which comprises subjecting to polymerization at least one vinyl ester of an aliphatic carboxylic acid containing at least 8 carbon atoms and a vinyl halide.

10. A process for the production of valuable products from vinyl esters, which comprises subjecting to polymerization at least one vinyl ester of an aliphatic carboxylic acid containing at least 8 carbon atoms and vinyl chloride.

11. A vinyl ester of an aliphatic carboxylic acid containing at least 8 carbon atoms, interpolymerized with another organic substance polymerizable under the same conditions as the said vinyl ester.

12. A vinyl ester of an aliphatic carboxylic acid containing at least 8 carbon atoms, interpolymerized with another vinyl compound.

13. A vinyl ester of an aliphatic carboxylic acid containing at least 8 carbon atoms, interpolymerized with another vinyl ester.

14. The vinyl ester of oleic acid interpolymerized with vinyl chloride.

15. Polymerized vinyl ester of ethyl(2)-hexanecarboxylic(1) acid.

WALTER REPPE.
WERNER STARCK.
ARTHUR VOSS.